(12) United States Patent
Jin et al.

(10) Patent No.: US 12,494,557 B2
(45) Date of Patent: Dec. 9, 2025

(54) BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Haizu Jin, Ningde (CN); Xinzhan Wu, Ningde (CN); Zhenhua Li, Ningde (CN); Kaijie You, Ningde (CN); Wenwei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 599 days.

(21) Appl. No.: 17/894,015

(22) Filed: Aug. 23, 2022

(65) Prior Publication Data

US 2022/0416375 A1     Dec. 29, 2022

Related U.S. Application Data

(63) Continuation of application No. PCT/CN2020/113796, filed on Sep. 7, 2020.

(51) Int. Cl.
*H01M 50/54* (2021.01)

(52) U.S. Cl.
CPC ........ *H01M 50/54* (2021.01); *H01M 2220/20* (2013.01)

(58) Field of Classification Search
CPC .......................... H01M 50/54; H01M 2220/20
USPC ........................................ 429/163
See application file for complete search history.

(56) References Cited

U.S. PATENT DOCUMENTS

| 2004/0038124 A1 | 2/2004 | Hisamitsu et al. |
| 2006/0040176 A1 | 2/2006 | Ling et al. |
| 2012/0196174 A1* | 8/2012 | Mikus ................. H01M 50/176 |
| | | 429/153 |

(Continued)

FOREIGN PATENT DOCUMENTS

| CN | 101088192 A | 12/2007 |
| CN | 205211833 U | 5/2016 |

(Continued)

OTHER PUBLICATIONS

The European Patent Office (EPO) The Extended European Search Report for Application No. 20952033.7 Jan. 29, 2024 8 Pages.

(Continued)

*Primary Examiner* — Dustin Q Dam
*Assistant Examiner* — Robert Gene West
(74) *Attorney, Agent, or Firm* — ANOVA LAW GROUP, PLLC (57) ABSTRACT

This application provides a battery cell, a battery, and an electric apparatus. The battery cell includes: an electrode assembly, including a body portion and a first tab. A first size L1 of the body portion in a length direction thereof is greater than a second size L2 of the body portion in a width direction thereof. The first tab is located on at least one end of the body portion in the width direction. The first tab has a third size L3 in the length direction. The first size L1, the second size L2, and the third size L3 satisfy $0.5L2 \leq L3 \leq L1$. The battery cell according to an embodiment of this application is intended to resolve a technical problem of severe heat generation by a tab.

18 Claims, 10 Drawing Sheets

(56) References Cited

U.S. PATENT DOCUMENTS

2013/0295445 A1* 11/2013 Byun ................. H01M 50/528
  429/163
2019/0020018 A1*  1/2019 Zeng ................. H01M 10/0525

FOREIGN PATENT DOCUMENTS

| CN | 108011069 A  | 5/2018  |
| CN | 207587901 U  | 7/2018  |
| CN | 109273757 A  | 1/2019  |
| CN | 110165113 A  | 8/2019  |
| CN | 110518174 A  | 11/2019 |
| EP |   2404338 B1 | 9/2015  |
| EP |   3933951 A1 | 1/2022  |
| JP | 2010080325 A | 4/2010  |

OTHER PUBLICATIONS

Contemporary Amperex Technology Co. Limited, International Search Report and Written Opinion, PCT/CN2020/113796, Jun. 11, 2021, 13 pgs.

* cited by examiner

BATTERY CELL, BATTERY, AND ELECTRIC APPARATUS

CROSS-REFERENCE TO RELATED APPLICATION

This application is a continuation application of PCT Patent Application No. PCT/CN2020/113796, entitled "BATTERY CELL, BATTERY, AND POWER CONSUMING DEVICE" filed on Sep. 7, 2020, which is incorporated herein by reference in its entirety.

TECHNICAL FIELD

This application relates to the field of battery technologies, and in particular, to a battery cell, a battery, and an electric apparatus.

BACKGROUND

With the development of society, science and technology, batteries have been broadly applied to provide energy to high power apparatuses, such as electric vehicles. A battery includes a plurality of battery cells connected in series or parallel, so as to achieve high capacity or power. An electrode assembly of the battery cell includes a body portion and a tab. The body portion is configured to generate or store electrical energy. The tab is configured to electrically connect the body portion and an external mechanical part. A growing requirement for endurance capability of an electric vehicle inevitably leads to an increasingly high requirement for capacity of the battery cell, so the body portion of the electrode assembly becomes bigger correspondingly. However, as the sizes of the body portion increase, the tab generates heat severely, affecting safe use of the battery cell.

SUMMARY

This application provides a battery cell, a battery, and an electric apparatus, to resolve a technical problem of severe heat generation by a tab.

An embodiment of this application provides a battery cell, including:

an electrode assembly, including a body portion and a first tab, where a first size $L1$ of the body portion in a length direction thereof is greater than a second size $L2$ of the body portion in a width direction thereof; the first tab is located on at least one end of the body portion in the width direction; the first tab has a third size $L3$ in the length direction; and the first size $L1$, the second size $L2$, and the third size $L3$ satisfy $0.5L2 \leq L3 \leq L1$.

The battery cell in this embodiment of this application includes an electrode assembly. The electrode assembly includes a body portion and a first tab. The first tab is located on at least one end of the body portion in the width direction; Because the first size $L1$ of the body portion in the length direction is greater than the second size $L2$ of the body portion in the width direction, the size of the first tab disposed on an end surface of the body portion corresponding to the length direction is no longer restricted by the second size $L2$ of the body portion in the width direction, so that the third size $L3$ of the first tab in the length direction can be set greater than or equal to a half of the second size $L2$ of the body portion in the width direction. This helps improve current flow capacity of the first tab, to reduce the possibility of severe heat generation by the first tab due to insufficient current flow capacity.

In an embodiment of this application, the first size $L1$, the second size $L2$, and the third size $L3$ satisfy $L2 \leq L3 \leq L1$. In this way, the third size $L3$ of the first tab in the length direction may be greater than or equal to the second size $L2$ of the body portion in the width direction, thereby helping further improve the current flow capacity of the first tab.

In an embodiment of this application, the first size $L1$ and the second size $L2$ satisfy that a ratio of $L1$ to $L2$ ranges from 4 to 20.

In an embodiment of this application, the battery cell further includes: a housing, where an electrode assembly is located inside the housing; a first end cap, located on a side of the electrode assembly in the length direction and configured to close a first opening of the housing; a first electrode terminal, disposed on the first end cap; and a first adapting component, configured to connect the first electrode terminal to the first tab.

In an embodiment of this application, the electrode assembly further includes a second tab with a polarity opposite to that of the first tab, and the first tab and the second tab are respectively disposed on two ends of the body portion in the width direction. The first tab and the second tab are separately disposed, so that the first tab and the second tab each can make full use of an area of a corresponding end surface to select a size in the length direction. This allows the sizes of the first tab and the second tab to be selected in the length direction with smaller restriction and in wider range.

In an embodiment of this application, the second tab has a fourth size $L4$ in the length direction, and the first size $L1$, the second size $L2$, and the fourth size $L4$ satisfy $0.5L2 \leq L4 \leq L1$. Because the first size $L1$ of the body portion in the length direction is greater than the second size $L2$ of the body portion in the width direction, the size of the second tab deposed on an end surface is no longer restricted by the second size $L2$ of the body portion in the width direction, so that the fourth size $L4$ of the second tab in the length direction can be set greater than or equal to a half of the second size $L2$ of the body portion in the width direction. This helps improve the current flow capacity of the second tab, so that the current flow capacity of the second tab can meet a current flow requirement of the body portion after capacity of the body portion is increased, thereby reducing the possibility of severe heat generation by the second tab due to insufficient current flow capacity.

In an embodiment of this application, the electrode assembly further includes a second tab with a polarity opposite to that of the first tab, the first tab and the second tab are disposed on a same end of the body portion in the width direction, and the first tab and the second tab are spaced apart in the length direction.

In an embodiment of this application, the first size $L1$, the second size $L2$, and the third size $L3$ satisfy $0.5L2 \leq L3 < 0.5L1$. The second tab has a fourth size $L4$ in the length direction, and the first size $L1$, the second size $L2$, and the fourth size $L4$ satisfy $0.5L2 \leq L4 < 0.5L1$. In this way, in the length direction, the first tab and the second tab are not in contact with each other, ensuring that the first tab and the second tab are not short-circuited by each other while having sufficient current flow capacity.

In an embodiment of this application, the first adapting component includes a first adapting plate and a second adapting plate, the first adapting plate is configured to be connected to the first electrode terminal, and the second adapting plate is configured to be connected to the first tab.

In an embodiment of this application, the electrode assembly further includes a second tab with a polarity opposite to that of the first tab, the first tab includes two first sub-tabs, the two first sub-tabs are respectively located on two ends of the body portion in the width direction, the second tab includes two second sub-tabs, and the two second sub-tabs are respectively located on two ends of the body portion in the width direction.

In an embodiment of this application, the first sub-tab and the second sub-tab on a same end of the body portion are spaced apart in the length direction. The first tab is divided into two first sub-tabs and the second tab is divided into two second sub-tabs. This manner can effectively reduce the number of tabs disposed on one end of the body portion, thereby effectively lowering the possible difficulty in connecting the first tab and the second tab respectively to the first adapting component and the second adapting component caused by a great thickness resulted from a large number of the first tabs or the second tabs disposed on one end of the body portion. This manner can also effectively improve heat dissipation efficiency of the first tab and the second tab, reducing the possibility of severe heat generation by the first tab or the second tab caused by poor heat dissipation resulted from a large number of the first tabs or the second tabs.

In an embodiment of this application, the first adapting component includes a first adapting plate and two second adapting plates, the first adapting plate is configured to be connected to the first electrode terminal, and the two second adapting plates are configured to be respectively connected to the two first sub-tabs.

In an embodiment of this application, the two first sub-tabs and the two second sub-tabs are disposed in a staggered manner in the width direction.

In an embodiment of this application, the second adapting plate includes a body part and a bending part, the body part is configured to be connected to the first adapting plate, and the bending part is configured to be connected to the first tab. Before the bending part is bent, the first tab and the bending part may be connected and fastened, and then the bending part may be bent towards the body part to a predetermined position. This can lower the possible difficulty in connecting the first tab and the second adapting plate due to the second adapting plate being close to the body portion, making it easier to connect the first tab and the second adapting plate.

In an embodiment of this application, the battery cell further includes: a second end cap, located on the other side of the electrode assembly in the length direction and configured to close a second opening of the housing; a second electrode terminal, disposed on the second end cap; and a second adapting component, configured to connect the second electrode terminal and the second tab.

The battery cell in this embodiment of this application includes a housing and an electrode assembly. The electrode assembly is disposed inside the housing. A surface of the body portion of the electrode assembly parallel to the width direction faces towards a first opening of the housing. An end surface of the body portion parallel to the length direction faces towards a side wall of the housing. The first tab is disposed on the end surface of the body portion. The first tab is located between the end surface of the body portion and the housing. Therefore, the first tab is disposed on the end surface and the first size L1, the second size L2, and the third size L3 satisfy 0.5L2≤L3≤L1, so that the size of the first tab is no longer restricted by the second size L2 of the body portion in the width direction. This helps improve the current flow capacity of the first tab, to reduce the possibility of severe heat generation by the first tab due to insufficient current flow capacity. In this way, the overall length of the electrode assembly is no longer restricted by the current flow capacity of the first tab, so that an electrode assembly with a greater length but the same width can be processed and produced. This effectively increases energy density of the electrode assembly, and helps increase the energy density of the battery cell without increasing overall space occupancy of the battery cell in the width direction.

An embodiment of this application further provides a battery, including the battery cell according to the foregoing embodiments.

An embodiment of this application further provides an electric apparatus, including the battery cell according to the foregoing embodiments, where the battery cell is configured to supply electrical energy.

BRIEF DESCRIPTION OF DRAWINGS

To describe the technical solutions according to embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

In the accompanying drawings, the figures are not drawn to scale.

DETAILED DESCRIPTION OF EMBODIMENTS

The following further describes the embodiments of this application in detail with reference to the accompanying drawings and implementations. The detailed description and accompanying drawings of the following embodiments are used to exemplarily illustrate the principle of this application, but are not intended to limit the scope of this application, that is, this application is not limited to the described embodiments.

In the descriptions of this application, it should be noted that, unless otherwise stated, "plurality" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first", "second", "third", and the like are merely intended for a purpose of description, and shall not be understood as an indication or implication of relative importance. "Vertical" means being vertical with an allowable range of error other than being strictly vertical. "Parallel" means being parallel with an allowable range of error other than being strictly parallel.

The orientation terms appearing in the following descriptions all are directions shown in the figures, and do not limit the specific structure of the application. In the descriptions of this application, it should be further noted that unless otherwise specified and defined explicitly, the terms "installment", "link", and "connection" should be understood in their general senses. For example, the terms may be a fixed connection, a detachable connection, or an integrated connection, or may be a direct connection, or an indirect connection through an intermediate medium. A person of ordinary skill in the art can understand specific meanings of these terms in this application based on specific situations.

The applicants have studied and analyzed a battery cell after discovering a problem of severe heat generation by a tab. The applicants have found that because a requirement for energy density of a battery cell is getting higher and space occupancy of the battery cell itself needs to meet requirements, the battery cell is made into a long-strip flat structure, so that the body portion of the electrode assembly is longer and in a long-strip flat structure. Usually, after the electrode assembly is disposed in a housing, the tab extends out from the body portion in a width direction. However, the tab extending out from the end surface of the body portion in the width direction has a problem of insufficient current flow capacity, failing to satisfy a demand for fast charging. The applicants improved the structure of the tab, for example, increasing the size of the tab. However, the tab still has the problem of insufficient current flow capacity after the size of the tab is increased in the width direction.

Based on the foregoing problem found, the applicants improved the structure of the battery cell. The following further describes the embodiments of this application.

For better understanding of this application, the following describes the embodiments of this application with reference to FIG. 1 to FIG. 10.

Figure 1:
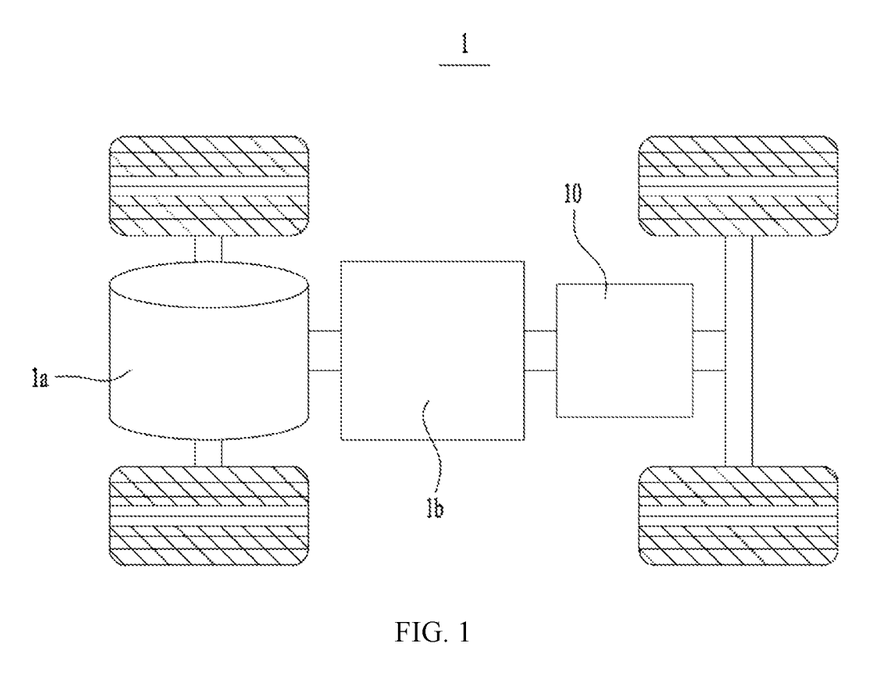
FIG. 1 is a schematic structural diagram of a vehicle disclosed in an embodiment of this application.

An embodiment of this application provides an electric apparatus using a battery 10 as a power supply. The electric apparatus may be, but is not limited to, a vehicle, a ship, or a flight vehicle. Referring to FIG. 1, an embodiment of this application provides a vehicle 1. The vehicle 1 may be an oil-fueled vehicle, a gas-powered vehicle, or a new energy vehicle. The new energy vehicle may be a battery electric vehicle, a hybrid electric vehicle, or an extended-range electric vehicle. In an embodiment of this application, the vehicle 1 may include a motor 1a, a controller 1b, and a battery 10. The controller 1b is configured to control the battery 10 to supply power to the motor 1a. The motor 1a is connected to wheels through a driving mechanism to drive the vehicle 1 forward. The battery 10 may be used as a driving power supply for the vehicle 1 to totally or partially replace fossil fuel or natural gas to provide driving power for the vehicle 1. In an example, a battery 10 may be disposed at the bottom, the front, or the rear of the vehicle 1. The battery 10 may be configured to supply power for the vehicle 1. In the example, the battery 10 may be used as an operational power supply for the vehicle 1 for a circuit system of the vehicle 1. Optionally, the battery 10 may be configured to supply power to meet the start, navigation, and driving requirements of the vehicle 1.

Figure 2:
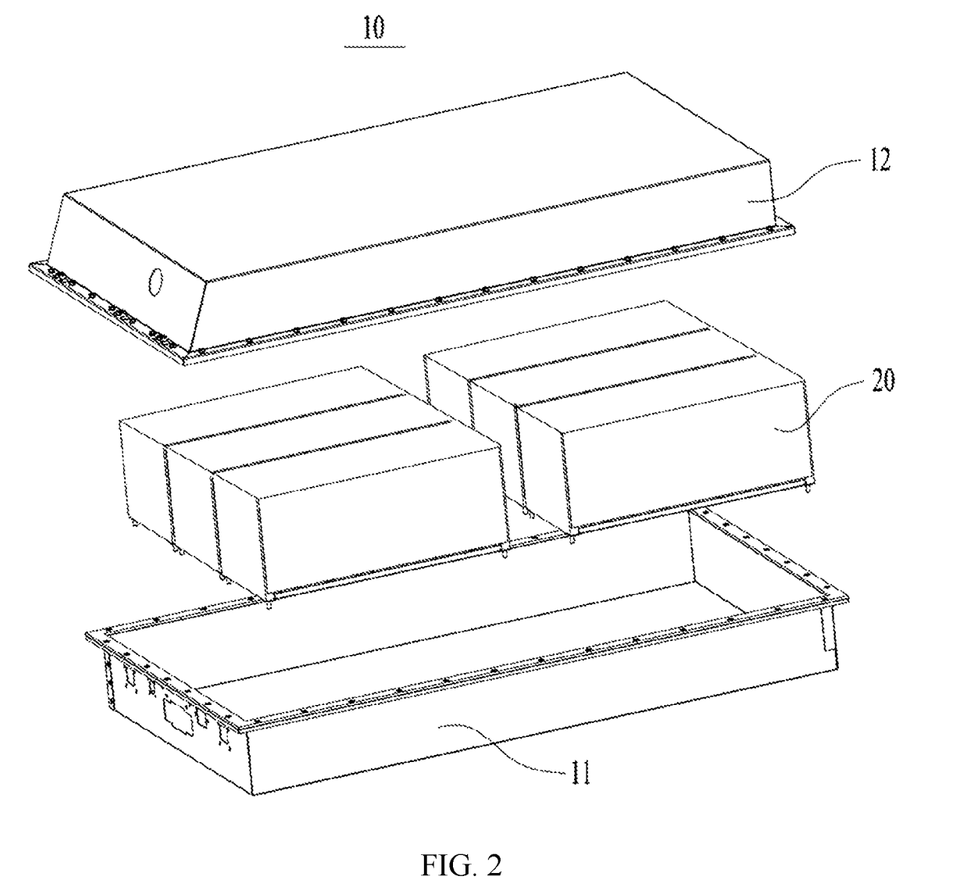
FIG. 2 is a schematic structural exploded view of a battery disclosed in an embodiment of this application.

Referring to FIG. 2, the battery 10 may include more than two battery modules 20. In some embodiments, the battery 10 further includes a box body. The battery module 20 is disposed inside the box body. The more than two battery modules 20 are arranged inside the box body. The box body is not limited to a specific type. The box body may be frame-shaped, disk-shaped, or box-shaped. Optionally, the box body includes a first shell 11 configured to accommodate the battery modules 20 and a second shell 12 engaged to the first shell 11. The first shell 11 is engaged to the second shell 12 to form an accommodating portion for accommodating the battery modules 20.

Figure 3:
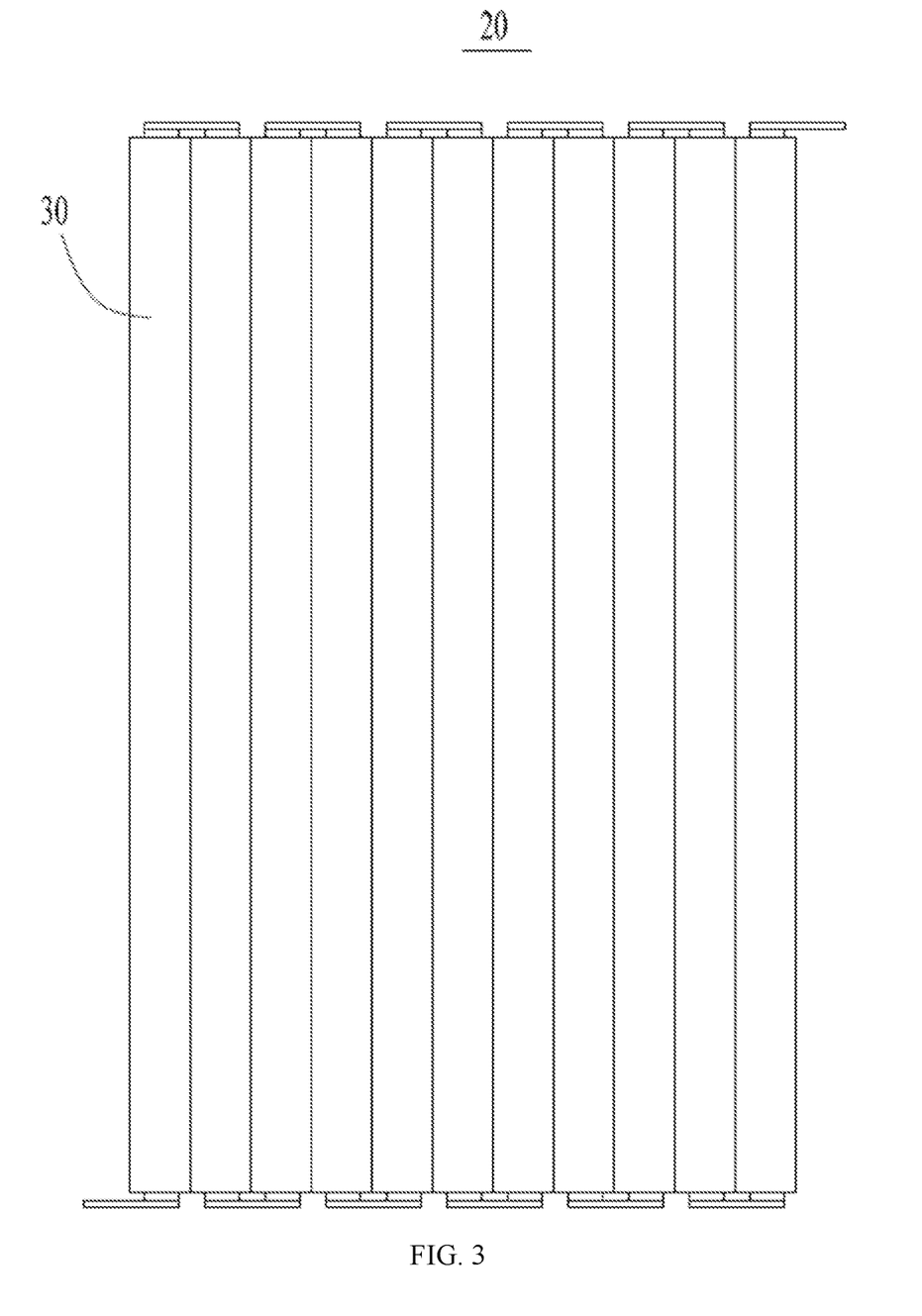
FIG. 3 is a schematic partial structure diagram of a battery module disclosed in an embodiment of this application.

To meet different requirements for power use, the battery module 20 may include one or more battery cells. Referring to FIG. 3, a plurality of battery cells 30 may first be connected in series, parallel, or series and parallel to constitute a battery module, and then a plurality of battery modules 20 may be connected in series, parallel, or series and parallel to constitute a battery. Optionally, the battery may include a plurality of battery cells 30, where the plurality of battery cells 30 may be connected in series, parallel, or series and parallel, and being connected in series and parallel means a combination of series and parallel connections. The plurality of battery cells 30 may be directly disposed inside the box body. To be specific, the plurality of battery cells may directly constitute a battery, or may first constitute a battery module, and then a plurality of battery modules constitute a battery. The battery cell 30 includes a lithium-ion secondary battery, a lithium-ion primary battery, a lithium-sulfur battery, a sodium-lithium-ion battery, or a magnesium-ion battery, but is not limited thereto.

Figure 4:
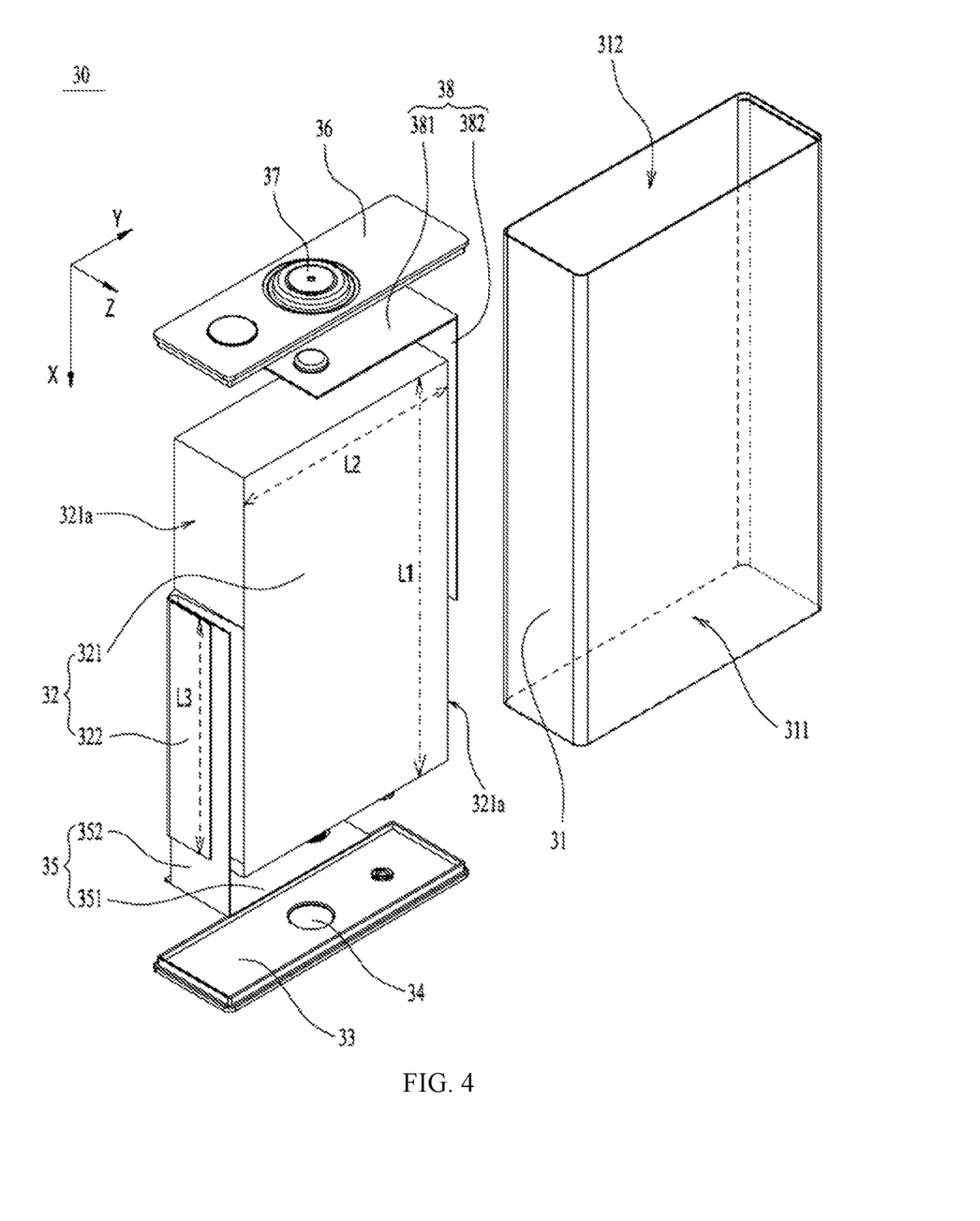
FIG. 4 is a schematic structural exploded view of a battery cell disclosed in an embodiment of this application.
Figure 5:
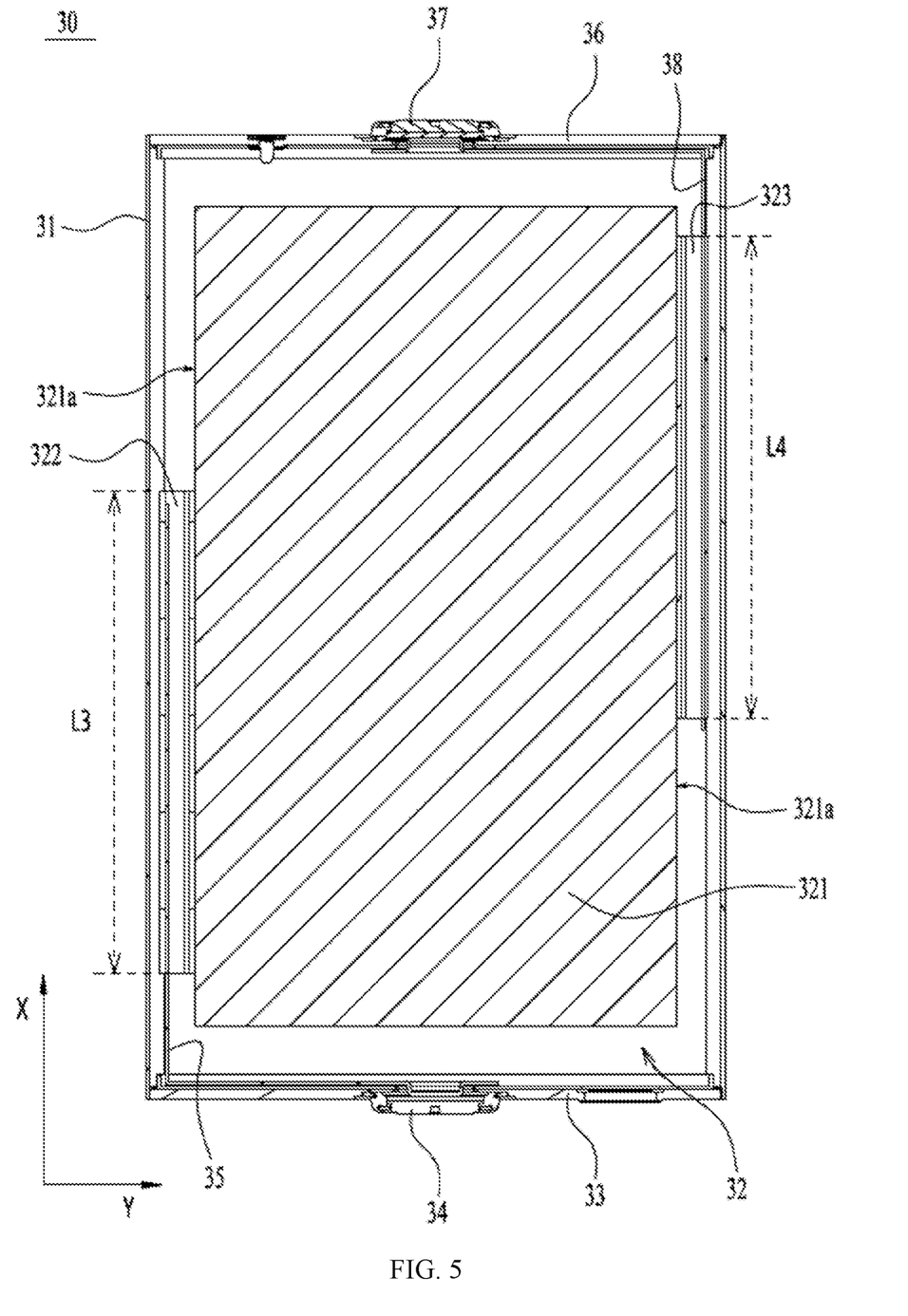
FIG. 5 is a schematic cross-sectional view of the battery cell according to the embodiment in FIG. 4.

Referring to FIG. 4 and FIG. 5, the battery cell 30 in an embodiment of this application includes a housing 31 and an electrode assembly 32 disposed inside the housing 31. The housing 31 in this embodiment of this application is rectangular or of other shapes. The housing 31 has an internal space for accommodating the electrode assembly 32 and an electrolyte and a first opening 311 communicating with the internal space. The housing 31 may be made of materials such as aluminum, aluminum alloy, or plastics. The electrode assembly 32 in this embodiment of this application may be formed through stacking or winding of a first electrode plate, a second electrode plate, and a separator located between the first electrode plate and the second electrode plate, where the separator is an insulator sandwiched between the first electrode plate and the second electrode plate. The first electrode plate and the second electrode plate each include a coated area and an uncoated area. An active substance is applied to the coated area of the first electrode plate and the coated area of the second electrode plate. On the coated area, the active substance is applied on a current collector formed by metal sheets, while on the uncoated area, no active substance is applied. The electrode assembly 32 includes a body portion 321 and a first tab 322. After stacking, the coated area of the first electrode plate, the coated area of the second electrode plate, and the separator are stacked to form the body portion 321. The uncoated areas of the first electrode plate are stacked to form the first tab 322. The uncoated areas of the second electrode plate are stacked to form a second tab 323. The first tab 322 and the second tab 323 have opposite polarities. For example, when the first tab 322 is a positive tab, the second tab 323 is a negative tab. When the first tab 322 is a negative tab, the second tab 323 is a positive tab.

The embodiments of this application are described by using an example in which the electrode assembly 32 is a lamination structure, but this does not limit the protection scope of this application. Referring to FIG. 4, the body portion 321 has a predetermined length, width, and thickness. Herein, the length is a size of the body portion 321 in a length direction X thereof, the width is a size of the body portion 321 in a width direction Y thereof, and the thickness is a size of the body portion 321 in a thickness direction Z thereof. A first size of the body portion 321 in the length direction X thereof is L1, and a second size of the body portion 321 in the width direction Y thereof is L2. The length direction X, the width direction Y, and the thickness direction Z are perpendicular to each other. The first size L1 of the body portion 321 is greater than the second size L2 of the body portion 321. The body portion 321 has two ends disposed opposite each other in the width direction Y thereof, and each end has an end surface 321a. After the electrode assembly 32 is disposed inside the housing 31, an end surface 321a of the body portion 321 faces towards the housing 31. The first tab 322 extends out from an end surface 321a of the body portion 321. A third size of the first tab 322 in the length direction X is L3. The first size L1, the second size L2, and the third size L3 satisfy $0.5L2 \leq L3 \leq L1$. For example, the third size L3 may be 0.5L2, 0.6L2, 0.7L2, 0.8L2, 0.9L2, L2, 0.1L1, 0.2L1, 0.3L1, 0.4L1, 0.5L1, 0.6L1, 0.7L1, 0.8L1, 0.9L1, L1, or the like.

The battery cell 30 in this embodiment of this application includes a housing 31 and an electrode assembly 32. The electrode assembly 32 is disposed inside the housing 31. A surface of the body portion 321 of the electrode assembly 32 parallel to the width direction Y faces towards a first opening 311 of the housing 31. An end surface 321a of the body portion 321 parallel to the length direction X faces towards a side wall of the housing 31. The first tab 322 is disposed on the end surface 321a of the body portion 321. The first tab 322 is located between the end surface 321a of the body portion 321 and the housing 31. Therefore, the first tab 322 is disposed on the end surface 321a, and the first size L1, the second size L2, and the third size L3 satisfy $0.5L2 \leq L3 \leq L1$, so that the size of the first tab 322 is no longer restricted by the second size L2 of the body portion 321 in the width direction Y. This helps improve the current flow capacity of the first tab 322, to reduce the possibility of severe heat generation by the first tab 322 due to insufficient current flow capacity. In this way, an overall length of the electrode assembly 32 is no longer restricted by the current flow capacity of the first tab 322, so that an electrode assembly 32 with a greater length but the same width can be processed and produced. This effectively increases energy density of the electrode assembly 32, and also helps increase the energy density of the battery cell 30 without increasing overall space occupancy of the battery cell 30 in the width direction Y.

When the battery cell 30 in this embodiment of this application is applied to the vehicle 1, the width direction Y of the battery cell 30 is the same as a height direction of the vehicle 1. Restricted by space of the vehicle 1 in the height direction, width of the battery cell 30 is also strictly restricted. As a result, when capacity of the battery cell 30 needs to be increased, the width of the battery cell 30 cannot be increased unlimitedly, but length of the battery cell 30 can be increased.

In some embodiments, the first size L1 of the body portion 321 in the length direction X and the second size L2 of the body portion 321 satisfy that a ratio of L1 to L2 ranges from 4 to 20. A value of the first size L1 ranges from 35 centimeters (cm) to 100 centimeters (cm).

In some embodiments, the first size L1, the second size L2, and the third size L3 satisfy $L2 \leq L3 \leq L1$. For example, the third size L3 may be L2, 2L2, 3L2, 4L2, 5L2, or the like. In this way, the third size L3 of the first tab 322 in the length direction X may be greater than or equal to the second size L2 of the body portion 321 in the width direction Y, thereby helping further improve the current flow capacity of the first tab 322.

Referring to FIG. 4, the battery cell 30 in this embodiment of this application further includes a first end cap 33, a first electrode terminal 34, and a first adapting component 35. The first end cap 33 is connected to the housing 31 and closes a first opening 311 of the housing 31. For example, the first end cap 33 may be connected to the housing 31 by welding. The first end cap 33 is located on a side of the electrode assembly 32 in the length direction X. In the length direction X, the first end cap 33 is disposed opposite a surface of the body portion 321 parallel to the width direction Y. The first electrode terminal 34 is disposed on the first end cap 33. The first electrode terminal 34 may be round-shaped or square-shaped, which is not limited herein. The first electrode terminal 34 is electrically connected to the first tab 322 of the electrode assembly 32 through the first adapting component 35. In a case that the third size L3 of the first tab 322 in the length direction X is smaller than the first size L1 of the body portion 321 in the length direction X, the first tab 322 is disposed in an area of the body portion 321 closer to the first end cap 33, thereby helping shorten connection distance to the first adapting component 35.

In some embodiments, referring to FIG. 4, the first adapting component 35 includes a first adapting plate 351 and a second adapting plate 352. The first adapting plate 351 and the second adapting plate 352 form an L shape, and the first adapting plate 351 is configured to be connected to the first electrode terminal 34. The second adapting plate 352 is configured to be connected to the first tab 322. In an example, the second adapting plate 352 is connected to the first tab 322 by welding.

In some embodiments, referring to FIG. 5, the first tab 322 and the second tab 323 are respectively disposed on two ends of the body portion 321 in the width direction Y. The first tab 322 and the second tab 323 are separately disposed, so that the first tab 322 and the second tab 323 each can make full use of an area of an end surface 321a to select a size in the length direction X, thereby preventing the first tab 322 and the second tab 323 from interfering with each other in the length direction X.

In some embodiments, referring to FIG. 5, the second tab 323 has a fourth size L4 in the length direction X. The first size L1, the second size L2, and the fourth size L4 satisfy $0.5L2 \leq L4 \leq L1$. For example, the fourth size L4 may be 0.5L2, 0.6L2, 0.7L2, 0.8L2, 0.9L2, L2, 0.1L1, 0.2L1, 0.3L1, 0.4L1, 0.5L1, 0.6L1, 0.7L1, 0.8L1, 0.9L1, L1, or the like.

The second tab 323 is disposed on an end surface 321a of the body portion 321. The second tab 323 is located between the end surface 321a of the body portion 321 and the housing 31. Therefore, the second tab 323 is disposed on the end surface 321a, and the first size L1, the second size L2, and the fourth size L4 satisfy $0.5L2 \leq L4 \leq L1$, so that the size of the second tab 323 is no longer restricted by the second size L2 of the body portion 321 in the width direction Y. This helps improve the current flow capacity of the second tab 323, to reduce the possibility of severe heat generation by the second tab 323 due to insufficient current flow capacity. In this way, an overall length of the electrode assembly 32 is no longer restricted by the current flow capacity of the second tab 323, so that an electrode assembly 32 with a greater length but the same width can be processed and produced. This effectively increases energy density of the electrode assembly 32, and helps increase the energy density of the battery cell 30 without increasing overall space occupancy of the battery cell 30 in the width direction Y. In some embodiments, the third size L3 of the first tab 322 in the length direction X is equal to the fourth size L4 of the second tab 323 in the length direction X.

In some embodiments, referring to FIG. 4 and FIG. 5, the battery cell 30 further includes a second end cap 36, a second electrode terminal 37, and a second adapting component 38. The housing 31 further includes a second opening 312. In the length direction X, the first opening 311 is disposed opposite the second opening 312. The second end cap 36 is connected to the housing 31 and closes the second opening 312 of the housing 31. For example, the second end cap 36 may be connected to the housing 31 by welding. The second end cap 36 is located on the other side of the electrode assembly 32 in the length direction X. In the length direction X, the first end cap 33 is disposed opposite the second end cap 36. In the length direction X, the second end cap 36 is disposed opposite a surface of the body portion 321 parallel to the width direction Y. The second electrode terminal 37 is disposed on the second end cap 36. The second electrode terminal 37 may be round-shaped or square-shaped, which is not limited herein. The second electrode terminal 37 is connected to the second tab 323 of the electrode assembly 32 through the second adapting component 38. In a case that the fourth size L4 of the second tab 323 in the length direction X is smaller than the first size L1 of the body portion 321 in the length direction X, the second tab 323 is disposed on an area of the body portion 321 closer to the second end cap 36, thereby helping shorten connection distance to the second adapting component 38. In an example, the second adapting component 38 includes a third adapting plate 381 and a fourth adapting plate 382. The third adapting plate 381 is configured to be connected to the second electrode terminal 37. The fourth adapting plate 382 is configured to be connected to the second tab 323. In an example, the first adapting component 35 and the second adapting component 38 have the same structure, meaning that the first adapting plate 351 and the third adapting plate 381 have the same structure and the second adapting plate 352 and the fourth adapting plate 382 have the same structure. In an example, the fourth adapting plate 382 is connected to the second tab 323 by welding.

Figure 6:
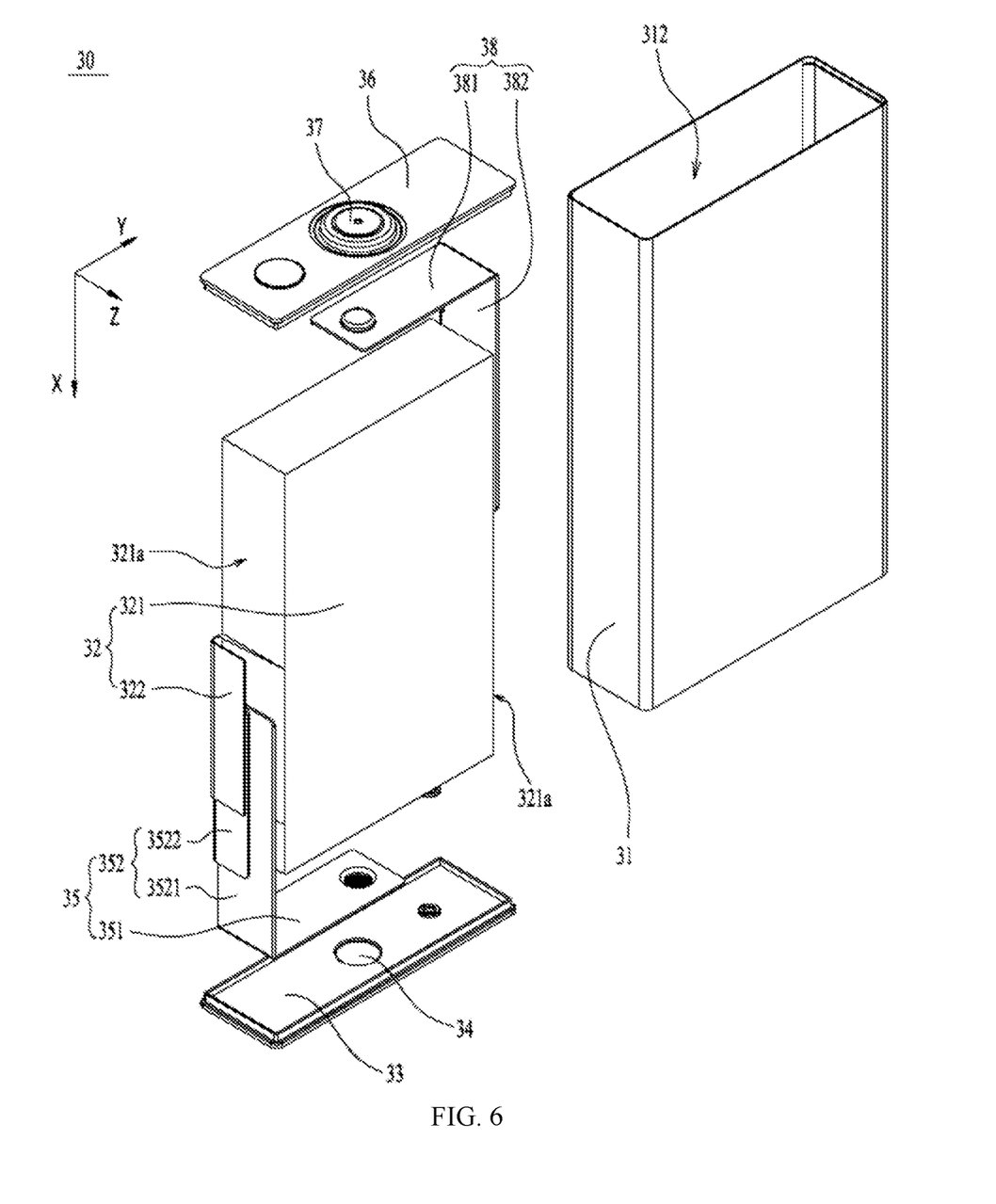
FIG. 6 is a schematic structural exploded view of a battery cell disclosed in another embodiment of this application.

In some embodiments, referring to FIG. 6, the second adapting plate 352 of the first adapting component 35 includes a body part 3521 and a bending part 3522. The body part 3521 is configured to be connected to the first adapting plate 351. The bending part 3522 is configured to be connected to the first tab 322. Before the bending part 3522 is bent, the first tab 322 and the bending part 3522 may be connected and fastened, and then the bending part 3522 may be bent towards the body part 3521 to a predetermined position. In this way, space occupied by the second adapting plate 352 in the width direction Y can be reduced, and energy density is increased.

Figure 7:
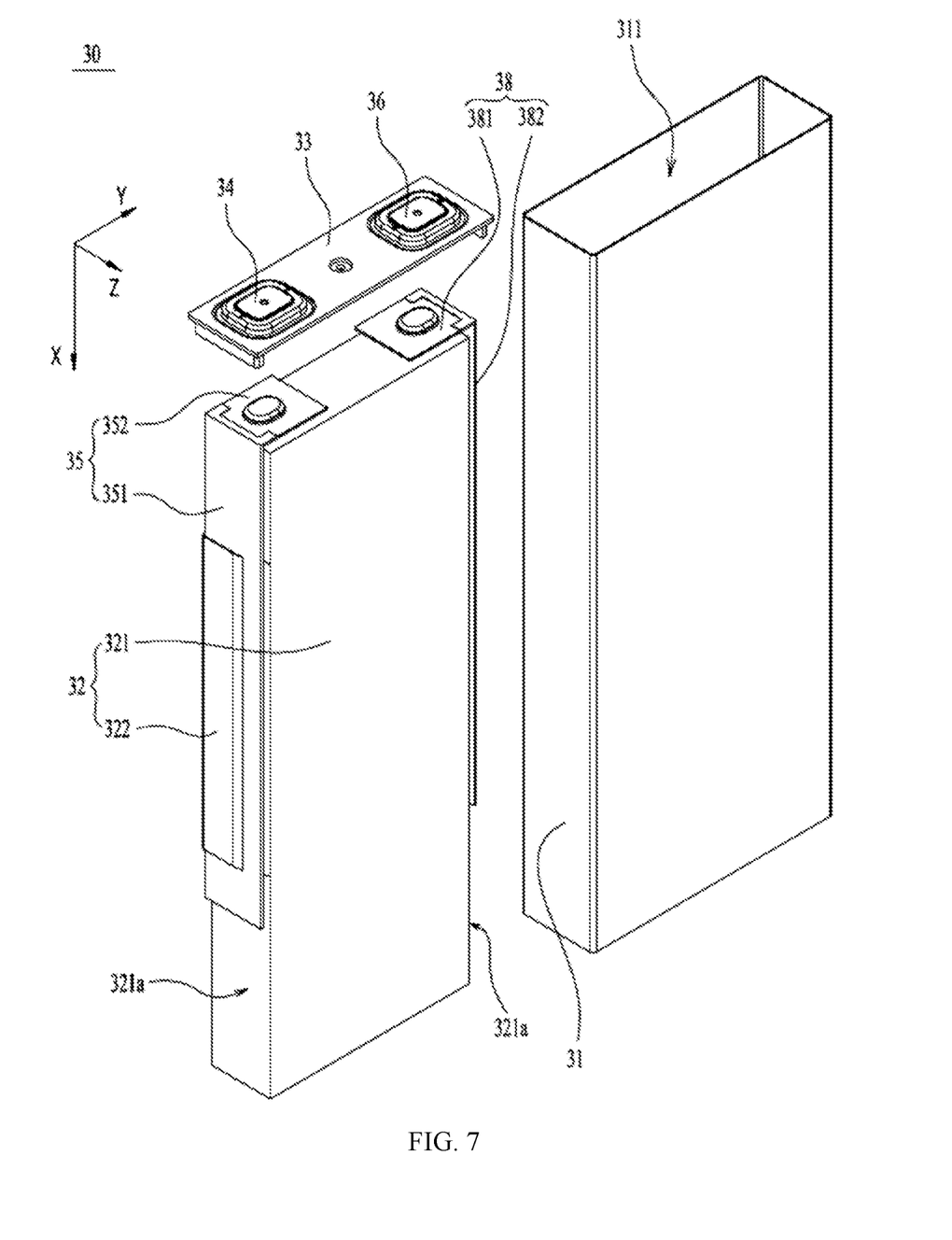
FIG. 7 is a schematic structural exploded view of a battery cell disclosed in still another embodiment of this application.
Figure 8:
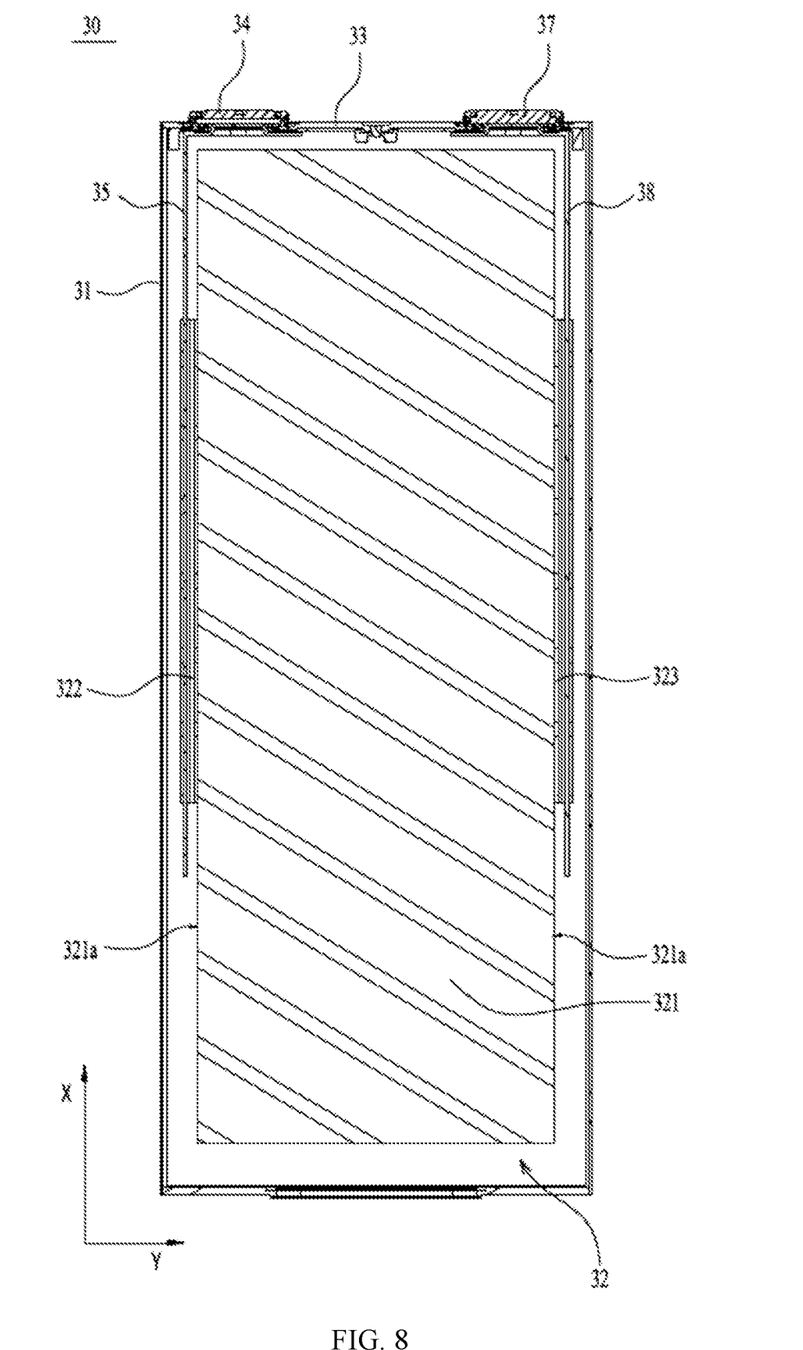
FIG. 8 is a schematic cross-sectional view of the battery cell according to the embodiment in FIG. 7.

In some embodiments, referring to FIG. 7 and FIG. 8, the housing 31 has a first opening 311. The electrode assembly 32 is disposed inside the housing 31. The first end cap 33 is connected to the housing 31 and closes the first opening 311. The first electrode terminal 34 and the second electrode terminal 37 are both disposed on the first end cap 33. The first tab 322 and the second tab 323 are respectively disposed on two ends of the body portion 321 in the width direction Y. The first adapting component 35 and the second adapting component 38 are connected to the first electrode terminal 34 and the second electrode terminal 37, respectively.

Figure 9:
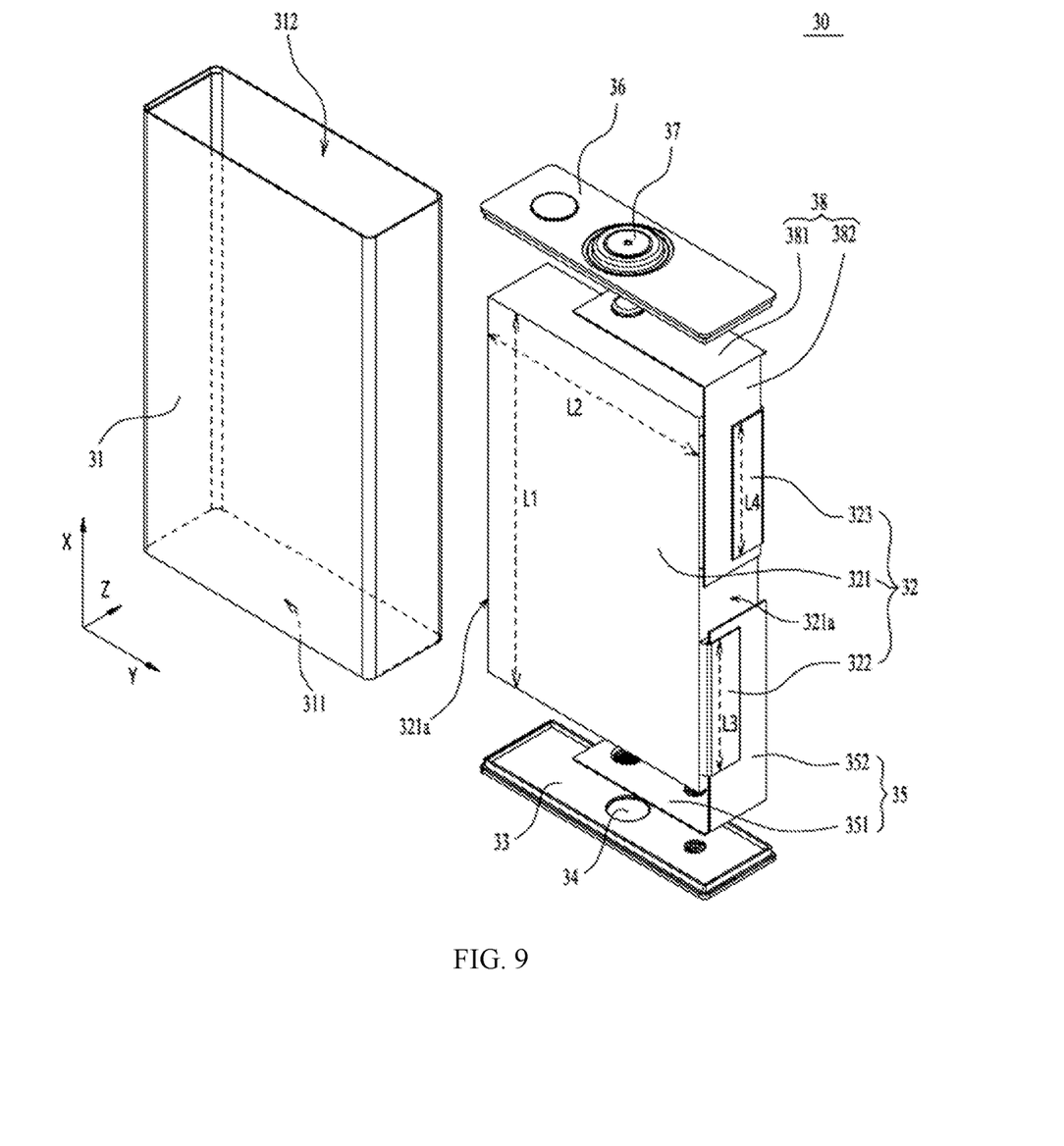
FIG. 9 is a schematic structural exploded view of a battery cell disclosed in still another embodiment of this application.

In some embodiments, referring to FIG. 9, the first tab 322 and the second tab 323 are disposed on a same end of the body portion 321 in the width direction Y, meaning that the first tab 322 and the second tab 323 are disposed on a same end surface 321a. The first tab 322 and the second tab 323 are spaced apart in the length direction X. In the length direction X, the first tab 322 and the second tab 323 are disposed in a staggered manner, meaning that in the length direction X, projections of the first tab 322 and the second tab 323 do not overlap. In some embodiments, the first size L1 of the body portion 321 in the length direction X, the second size L2 of the body portion 321 in the width direction Y, and the third size L3 of the first tab 322 in the length direction X satisfy $0.5L2 \leq L3 < 0.5L1$, and the first size L1 of the body portion 321 in the length direction X, the second size L2 of the body portion 321 in the width direction Y, and the fourth size L4 of the second tab 323 in the length direction X satisfy $0.5L2 \leq L4 < 0.5L1$. In this way, in the length direction X, the first tab 322 and the second tab 323 are not in contact with each other, ensuring that the first tab 322 and the second tab 323 are not short-circuited by each other while having sufficient current flow capacity. In a case that the first tab 322 and the second tab 323 are connected to the first adapting component 35 and the second adapting component 38 respectively, the first tab 322 and the second tab 323 are bent in opposite directions, thereby helping reduce the possibility of short circuit caused by contact between the first tab 322 and the second tab 323.

Figure 10:
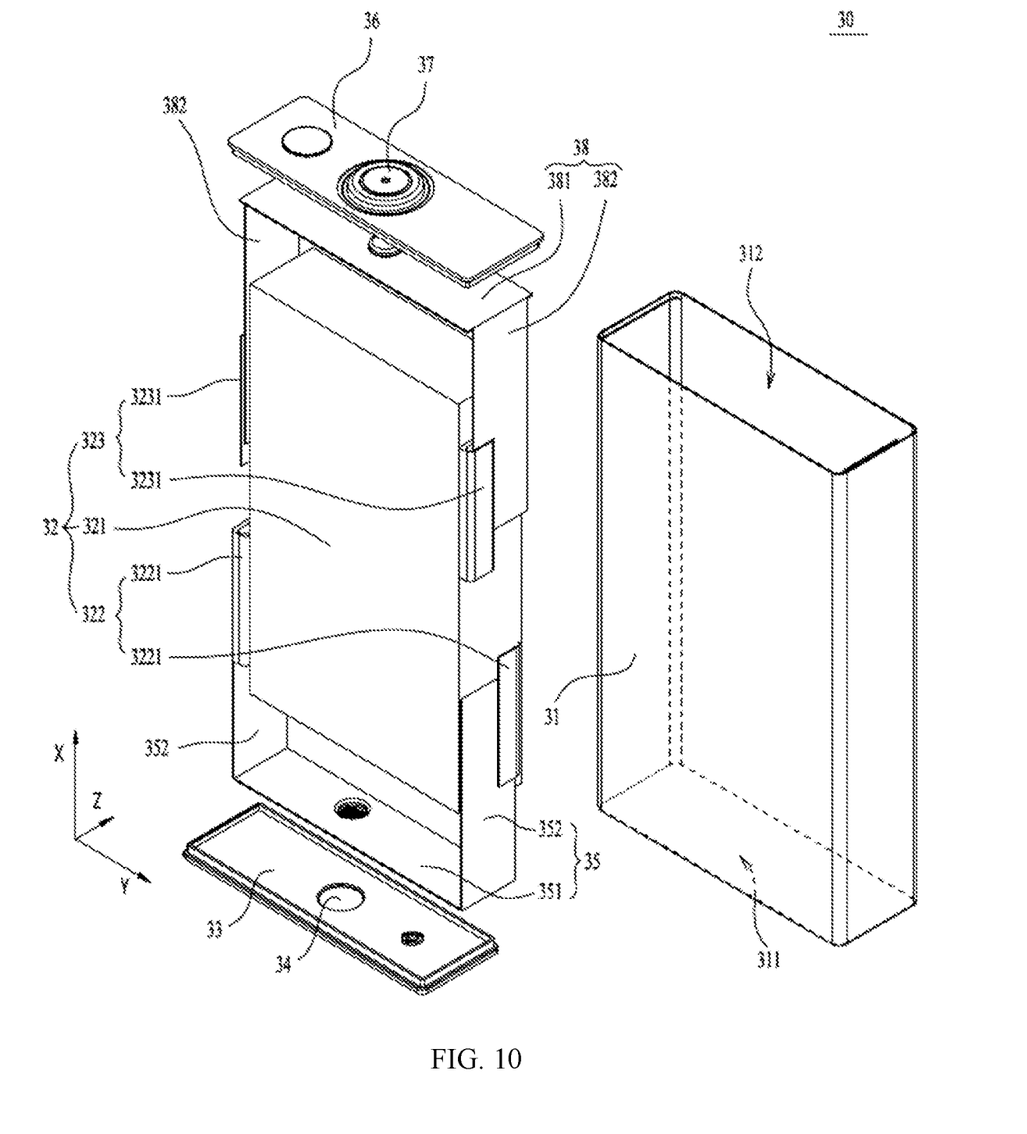
FIG. 10 is a schematic structural exploded view of a battery cell disclosed in yet another embodiment of this application.

In some embodiments, referring to FIG. 10, the first tab 322 includes two first sub-tabs 3221. The two first sub-tabs 3221 are respectively located on two ends of the body portion 321 in the width direction Y. The two first sub-tabs 3221 respectively extend out from the two end surfaces 321a of the body portion 321. The second tab 323 includes two second sub-tabs 3231. The two second sub-tabs 3231 are respectively located on two ends of the body portion 321 in the width direction Y. The two second sub-tabs 3231 respectively extends out from the two end surfaces 321a of the body portion 321. In a case that the electrode assembly 32 has a high capacity, a current flow requirement can be met only when there are a large number of the first tabs 322 and the second tabs 323. The first tab 322 is divided into two first sub-tabs 3221 and the second tab 323 is divided into two second sub-tabs 3231. This manner can effectively reduce the number of tabs disposed on one end of the body portion 321, thereby effectively lowering the possible difficulty in connecting the first tab 322 and the second tab 323 respectively to the first adapting component 35 and the second adapting component 38 caused by a great thickness resulted from a large number of the first tabs 322 or the second tabs 323 disposed on one end of the body portion 321. This manner can also effectively improve heat dissipation efficiency of the first tab 322 and the second tab 323, reducing the possibility of severe heat generation by the first tab 322 or the second tab 323 caused by poor heat dissipation resulted from a large number of the first tabs 322 or the second tabs 323.

In some embodiments, referring to FIG. 10, the first sub-tab 3221 and the second sub-tab 3231 on a same side of the body portion 321 are spaced apart in the length direction X. In this way, in the length direction X, the first sub-tab 3221 and the second sub-tab 3231 are not in contact with each other, ensuring that the first sub-tab 3221 and the second sub-tab 3231 are not short-circuited by each other while having sufficient current flow capacity. In a case that the first sub-tab 3221 and the second sub-tab 3231 are connected to the first adapting component 35 and the second adapting component 38 respectively, the first sub-tab 3221 and the second sub-tab 3231 are bent in opposite directions, thereby helping minimize an overlap between the first sub-tab 3221 and the second sub-tab 3231 in the length direction X, and further reducing the possibility of short circuit resulted from contact between the first sub-tab 3221 and the second sub-tab 3231.

In some embodiments, referring to FIG. 10, the two first sub-tabs 3221 are disposed in a staggered manner in the width direction Y, meaning that in the width direction Y, orthographic projections of the two first sub-tabs 3221 do not overlap. The two second sub-tabs 3231 are disposed in a staggered manner in the width direction Y, meaning that in the width direction Y, projections of the two second sub-tabs 3231 do not overlap. In an example, a first electrode plate, a second electrode plate, and a separator are stacked to form an electrode assembly 32. A half of the total first electrode plates form one first sub-tab 3221, and the other half of the total first electrode plates form another first sub-tab 3221. For example, there are totally 100 first electrode plates, of which 50 first electrode plates form one first sub-tab 3221, and the other 50 first electrode plates form another first sub-tab 3221. Further, the first sub-tab 3221 is formed by adjacent first electrode plates. Likewise, a half of the total second electrode plates form one second sub-tab 3231, and the other half of the total second electrode plates form another second sub-tab 3231. For example, there are totally 100 second electrode plates, of which 50 second electrode plates form one second sub-tab 3231, and the other 50 second electrode plates form another second sub-tab 3231. Further, the second sub-tab 3231 is formed by adjacent second electrode plates.

In some embodiments, referring to FIG. 10, the first adapting component 35 includes a first adapting plate 351 and two second adapting plates 352. The first adapting plate 351 is configured to be connected to the first electrode terminal 34. The two second adapting plates 352 are configured to be respectively connected to the two first sub-tabs 3221. The two second adapting plates 352 are located on a same side of the first adapting plate 351, making the first adapting component 35 a U-shaped structure. In an example, the first adapting plate 351 and the two second adapting plates 352 are an integrally formed structure.

In some embodiments, the second adapting component 38 includes a third adapting plate 381 and two fourth adapting plates 382. The third adapting plate 381 is configured to be connected to the second electrode terminal 37. The two fourth adapting plates 382 are configured to be respectively connected to the two second sub-tabs 3231. The two fourth adapting plates 382 are located on a same side of the third adapting plate 381, making the second adapting component 38 a U-shaped structure. In an example, the third adapting plate 381 and the two fourth adapting plates 382 are an integrally formed structure.

The battery cell 30 in this embodiment of this application includes a housing 31 and an electrode assembly 32. The electrode assembly 32 includes a body portion 321 and a first tab 322. The body portion 321 has predetermined length, width, and thickness. The length of the body portion 321 is greater than the width, and the width is greater than the thickness. The body portion 321 is opposite an opening of the housing 31 in a width direction Y. The body portion 321 has two opposite end surfaces 321a in the width direction Y thereof. The end surface 321a is parallel to the body portion 321 in a length direction X. In a case that the electrode assembly 32 is disposed inside the housing 31, the end surface 321a of the body portion 321 faces towards a side wall of the housing 31. The first tab 322 extends out from the end surface 321a. Therefore, the first tab 322 is disposed on the end surface 321a, and the first size L1, the second size L2, and the third size L3 satisfy $0.5L2 \leq L3 \leq L1$, so that the size of the first tab 322 is no longer restricted by the second size L2 of the body portion 321 in the width direction Y. This helps improve the current flow capacity of the first tab 322, to reduce the possibility of severe heat generation by the first tab 322 due to insufficient current flow capacity. In this way, an overall length of the electrode assembly 32 is no longer restricted by the current flow capacity of the first tab 322, so that an electrode assembly 32 with a greater length but the same width can be processed and produced. This effectively increases energy density of the electrode assembly 32, and also helps increase the energy density of the battery cell 30 without increasing overall space occupancy of the battery cell 30 in the width direction Y.

Although this application has been described with reference to the exemplary embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A battery cell, comprising:
   an electrode assembly, comprising a body portion, a first tab, and a second tab with a polarity opposite to that of the first tab, wherein:
   a first size L1 of the body portion in a length direction thereof is greater than a second size L2 of the body portion in a width direction thereof;
   the first tab is located on at least one end of the body portion in the width direction, the first tab has a third size L3 in the length direction, and the first size L1, the second size L2, and the third size L3 satisfy $0.5L2 \leq L3 \leq L1$; and
   the first tab comprises two first sub-tabs, and the two first sub-tabs are respectively located on two ends of the body portion in the width direction;
   a first electrode terminal, located on a side of the electrode assembly in the length direction; and
   a first adapting component, comprising a first adapting plate and two second adapting plates, wherein the first adapting plate is configured to be connected to the first electrode terminal, and the two second adapting plates are configured to be connected to the two first sub-tabs respectively.

2. The battery cell according to claim 1, wherein the first size L1, the second size L2, and the third size L3 satisfy $L2 \leq L3 \leq L1$.

3. The battery cell according to claim 1, wherein the first size L1 and the second size L2 satisfy that a ratio of L1 to L2 ranges from 4 to 20.

4. The battery cell according to claim 1, wherein the battery cell further comprises:
   a housing, wherein the electrode assembly is located inside the housing; and a first end cap, located on a side of the electrode assembly in the length direction and configured to close a first opening of the housing.

5. The battery cell according to claim 4, wherein the first tab and the second tab are respectively disposed on two ends of the body portion in the width direction.

6. The battery cell according to claim 5, wherein the second tab has a fourth size L4 in the length direction, and the first size L1, the second size L2, and the fourth size L4 satisfy 0.5L2≤L4≤L1.

7. The battery cell according to claim 4, wherein the first tab and the second tab are disposed on a same end of the body portion in the width direction, and the first tab and the second tab are spaced apart in the length direction.

8. The battery cell according to claim 7, wherein the first size L1, the second size L2, and the third size L3 satisfy 0.5L2≤L3<0.5L1, the second tab has a fourth size L4 in the length direction, and the first size L1, the second size L2, and the fourth size L4 satisfy 0.5L2≤L4<0.5L1.

9. The battery cell according to claim 4, wherein the second tab comprises two second sub-tabs, and the two second sub-tabs are respectively located on two ends of the body portion in the width direction.

10. The battery cell according to claim 9, wherein the first sub-tab and the second sub-tab on a same end of the body portion are spaced apart in the length direction.

11. The battery cell according to claim 9, wherein the two first sub-tabs are disposed in a staggered manner in the width direction, and the two second sub-tabs are disposed in a staggered manner in the width direction.

12. A battery, comprising the battery cell according to claim 1.

13. The battery according to claim 12, wherein the first size L1, the second size L2, and the third size L3 satisfy L2≤L3≤L1.

14. The battery according to claim 12, wherein the first size L1 and the second size L2 satisfy that a ratio of L1 to L2 ranges from 4 to 20.

15. The battery according to claim 12, wherein the battery cell further comprises:
a housing, wherein the electrode assembly is located inside the housing; and
a first end cap, located on a side of the electrode assembly in the length direction and configured to close a first opening of the housing.

16. An electric apparatus, comprising the battery according to claim 12, wherein the battery is configured to supply electrical energy to the electric apparatus.

17. The battery cell according to claim 1, wherein each of the two second adapting plates comprises a body part and a bending part, the body part is configured to be connected to the first adapting plate, and the bending part is configured to be connected to a corresponding one of the two first sub-tabs.

18. The battery cell according to claim 4, further comprising:
a second end cap, located on the other side of the electrode assembly in the length direction and configured to close a second opening of the housing;
a second electrode terminal, disposed on the second end cap; and
a second adapting component, configured to connect the second electrode terminal and the second tab.

* * * * *